United States Patent Office 2,921,260
Patented Jan. 12, 1960

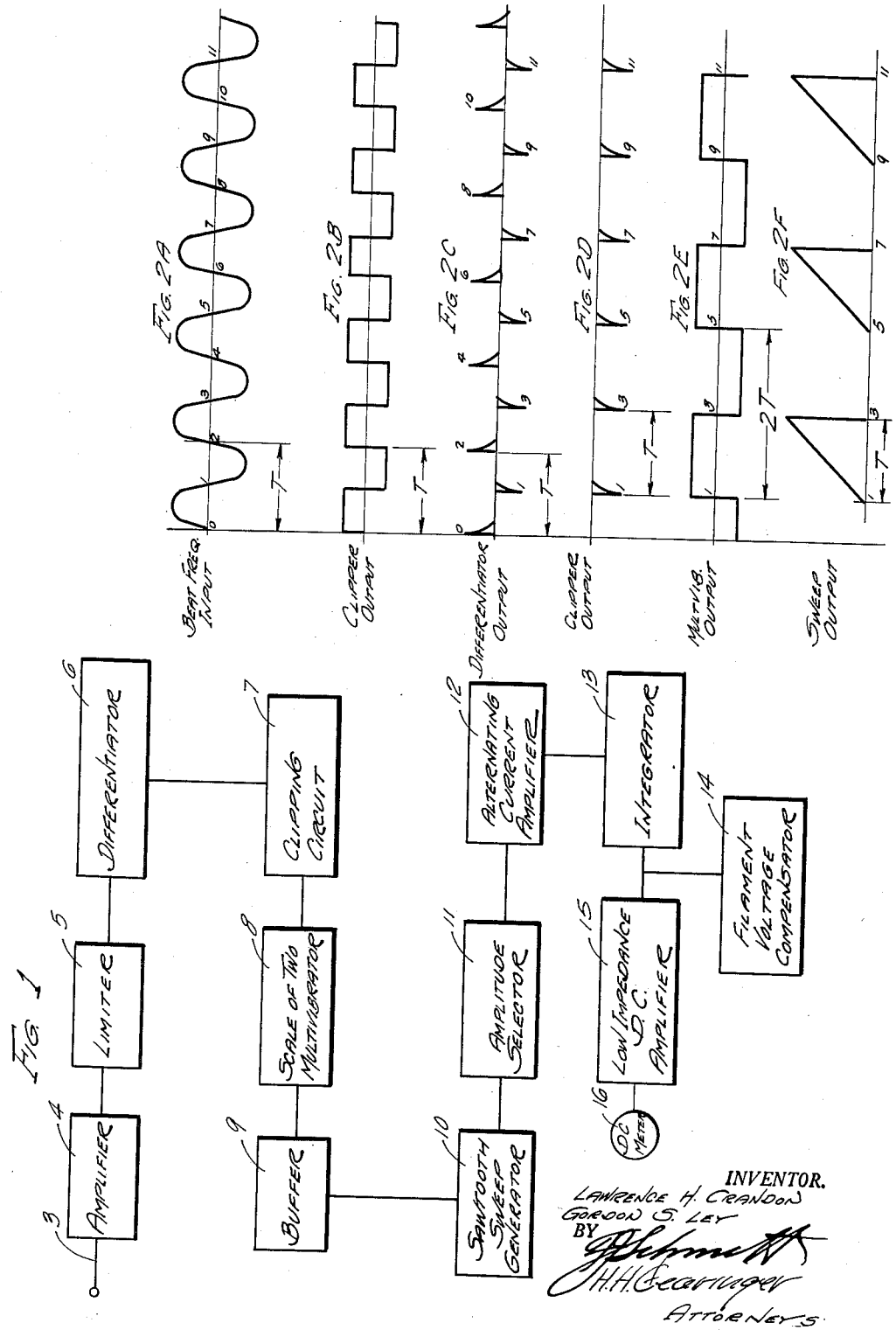
Jan. 12, 1960
L. H. CRANDON ET AL
2,921,260
FREQUENCY INDICATING DEVICE
Filed Feb. 23, 1954
INVENTOR.
LAWRENCE H. CRANDON
GORDON S. LEY
BY
ATTORNEYS

2,921,260

FREQUENCY INDICATING DEVICE

Lawrence H. Crandon, Los Angeles, Calif., and Gordon S. Ley, Plainfield, N.J., assignors, by mesne assignments, to the United States of America as represented by the Secretary of the Navy Application February 23, 1954, Serial No. 412,135

1 Claim. (Cl. 324—78)

The invention described herein relates to a novel and improved electronic device for continuously indicating the wavelength or period of electrical oscillations and more particularly to a wavelength indicating device which is specially adapted for use in determining the distance or range of a moving object or target by means of a reflected radio wave.

In various types of radar range detecting systems which are now in use it is customary to transmit a radio wave which is frequency modulated in the form of a saw-tooth. When this saw-tooth transmitted wave strikes an object or target which is capable of reflecting or reradiating the same, it is returned in part to its source where it is used to produce in the receiver a beat note between the reflected wave and the wave then being transmitted. By then measuring the frequency and/or the wavelength of this beat note an accurate and continuous indication of the range of the object can be obtained.

Inasmuch as the beat note signal is necessarily periodically interrupted by sudden changes of phase that occur during each fly-back portion of the modulating saw-tooth cycle, conventional types of frequency and/or wavelength meters have been found to provide a fluctuating indication which is highly inaccurate and which is particularly difficult to read. Similarly, although a number of other types of frequency and wavelength meters and the like have been specially designed for the above mentioned radar purposes, considerable difficulty has been experienced in obtaining a meter which is sufficiently accurate and stable in operation.

It is therefore a principal object of the present invention to provide a novel and improved electronic period or wavelength indicating device which gives highly accurate results and which is sufficiently stable in operation despite periodic sudden interruptions and discontinuities in the varying frequency source that is to be measured.

Other objects and many of the attendant advantages of this invention will be readily appreciated as the same becomes better understood by reference to the following detailed description when considered in connection with the accompanying drawings wherein:

Figure 1 is a diagrammatic view of a preferred embodiment of the present invention.

Figures 2A–2F are diagrammatic showings of the electric impulse waveforms at indicated points in the circuit shown in Figure 1.

In general the improved electronic apparatus which is responsive to a periodic oscillatory input signal of variable frequency and wavelength includes means for converting the said input signal into a square wave, means controlled by the square wave for producing a saw-tooth sweep voltage which rises linearly during alternate half cycles of the square wave from a predetermined minimum potential to a potential proportional to the wavelength of the wave, and means for producing a direct current voltage which is proportional to the said sweep voltage. It has been found that a particular accurate and stable continuous indication of the wavelength or period of the input signal can be obtained in this manner.

A diagrammatic showing of a preferred embodiment of the frequency measuring device of the present invention is illustrated in Figure 1 of the drawing. As shown therein, the input line 3 of the wavelength measuring device is preferably driven by a sine wave variable beat frequency signal output (see Figure 2A) of a suitable radar range unit in a manner which will be more apparent hereinafter. The amplifier 4 which is connected to the input line 3 is preferably of any suitable conventional design such as that of a pair of cascaded triodes or the like and is adapted to drive a suitable diode limiter or the like 5. As will be more apparent hereinafter the limiter 5 effectively squares off the extremities of the sine wave input signal and thereby transforms it into the square wave shown in Figure 2B of the drawing. The differentiator or the like 6 which is connected to the output circuit of the limiter 5 preferably includes a conventional resistance capacitance network which as will also be more apparent thereinafter then converts the square wave into the alternate positively and negatively directed pulses which are shown in Figure 2C of the drawing. The output of the differentiator 6 is coupled in any suitable manner to the clipping circuit or the like 7 whereby the positively directed pulses shown in Figure 2C are preferably substantially dissipated and/or eliminated so that only the negatively directed pulses in Figure 2D are passed on to the scale of two frequency divider multivibrators or the like 8 which is of any suitable conventional design. The buffer or the like 9 which is preferably connected to the output circuit of the multivibrator 8 effectively isolates the square wave output thereof from the various succeeding circuits of the apparatus. The saw-tooth generator 10 which is coupled to the output of the buffer 9 and which produces the output waveform shown in Figure 2F is operatively connected through the conventional amplitude selector or the like 11 and the amplifier unit 12 to the conventional integrator or the like 13 which as will be more apparent hereinafter is effectively a voltage averaging circuit. The output circuit of the integrator 13 together with that of the filament voltage compensator or the like 14 are connected to and are thereby adapted to drive the conventional direct current amplifier or the like 15 which as will be more apparent hereinafter provides an output potential that varies in accordance with the wavelength or period of the input signal shown in Figure 2A of the drawing. The direct current meter or the like 16 which is coupled in any suitable manner to the output circuit of the amplifier 15 is preferably calibrated in units which directly and continuously indicate the range of the moving target which is tracked by the radar unit.

In operation the input sine wave signal of Figure 2A the wavelength of which is to be continuously measured in accordance with the present invention is suitably amplified by the amplifier 4 and is then effectively transformed into the square wave signal shown in Figure 2B by the diode limiter or the like 5. As will be noted in Figures 2A and 2B the wavelength or period T of these signals remains unchanged during this limiting operation. The square wave output of the limiter 5 is then differentiated and clipped as is shown in Figures 2C and 2D of the drawing such that a series of pulses which are of a preselected polarity and which have a wavelength or period T will properly synchronize the scale of two multivibrators 8. As will be more apparent hereinafter by passing the wave through the multivibrator 8 before it is delivered to the generator 10 the length of each sawtooth pulse is made proportional to the time between successive negative zero crossings of the input sinewave so that errors due to asymmetrical distortion thereof are eliminated. Though as indicated in Figures 1 and 2E of the drawing the components of the multivibrator 8 are selected such that the wavelength or period 2T of its output square wave is preferably doubled, it is to be understood that any other suitable degree of frequency division (or wavelength multiplication) could be obtained without departing from the spirit or scope of the present invention.

The square wave output of the multivibrator 8 is then fed through the isolating buffer 9 into the input circuit of the saw-tooth generator or the like 10 where as shown in Figure 2F of the drawing it is transformed into successive linear increases in potential which rise to a potential that is proportional to the wavelength or period of the square-wave output of the multivibrator 8, and then quickly return to a predetermined minimum value such as ground potential during each negative half of the square wave pulse. As is noted in Figure 2 of the drawing each saw-tooth pulse of the generator 10 is initiated in synchronism with each negative going zero crossing of the sine wave input signal on line 3 and is terminated at the next negative going crossing thereof. In this way the peak swing of the saw tooth wave as well as the average value thereof is made proportional to the wavelength or period T of the sinewave input signal. The output pulses of the saw-tooth generator 10 are then fed through the amplitude selector 11 where the magnitude of the same is diminished a predetermined amount and through the amplifier 12 to the integrator 13, where a varying D.C. voltage is produced, the instantaneous magnitude of which is proportional to the wavelength of the output pulses of the saw-tooth generator. This D.C. output voltage of the integrator is then mixed with a suitable D.C. error correction voltage which is dependent upon undesirable variations of filament voltage and upon the aging of the tubes of the above described circuits and is fed through the low impedance direct current amplifier to the meter or the like 16 where it is accurately measured, preferably in suitable range units.

It is to be understood that although the wavelength responsive device of the present invention has been described and is particularly useful in connection with appropriate measurements in radar range systems, altimeters and the like, it could be used to accurately measure the period or wavelength of any type of varying electrical impulse without departing from the spirit or scope of the invention.

Obviously many modifications and variations of the present invention are possible in the light of the above teachings. It is therefore to be understood that within the scope of the appended claim the invention may be practiced otherwise than as specifically described.

What is claimed is:

Apparatus for measuring the wavelength of a periodic oscillatory input signal comprising a clipper circuit which converts the input signal into a square wave; means including a differentiating circuit, a clipping circuit, and a multivibrator for increasing by a predetermined multiple the wavelength of the said square wave; a sawtooth generator; means for initiating the charging cycle of the sawtooth generator at the beginning of each positive half cycle of the square wave; means for discharging the sawtooth generator at the end of each positive half cycle of the square wave; and an integrator circuit which is controlled by the output of the sawtooth generator and which provides a direct current voltage that is proportional thereto.

References Cited in the file of this patent
UNITED STATES PATENTS

| | | |
|---|---|---|
| 2,562,913 | Heeren | Aug. 7, 1951 |
| 2,572,788 | Weighton | Oct. 23, 1951 |
| 2,596,167 | Philpott | May 13, 1952 |
| 2,715,712 | Pulsford | Aug. 16, 1955 |
| 2,767,582 | Bartelink | Oct. 23, 1956 |